United States Patent [19]
Sorkin

[11] 4,091,847
[45] May 30, 1978

[54] PROCESS FOR FILLING DYNAMIC SCATTERING LIQUID CRYSTAL CELLS

[75] Inventor: Howard Sorkin, Berkeley Heights, N.J.

[73] Assignee: RCA Corporation, New York, N.Y.

[21] Appl. No.: 744,127

[22] Filed: Nov. 22, 1976

[51] Int. Cl.² .......................... G02F 1/13; C09K 3/34; B65B 31/04
[52] U.S. Cl. .......................................... 141/7; 141/9; 252/299; 350/350; 428/1
[58] Field of Search ................ 252/299; 350/160 LC; 141/1, 5, 7, 9; 428/1

[56] References Cited
U.S. PATENT DOCUMENTS

| | | | |
|---|---|---|---|
| 3,656,834 | 4/1972 | Haller et al. ............... | 350/160 LC |
| 3,698,449 | 10/1972 | Sorkin et al. ............... | 141/1 |
| 3,701,368 | 10/1972 | Stern ........................... | 141/1 |
| 3,799,651 | 3/1974 | Janning ...................... | 350/160 LC |
| 3,888,566 | 6/1975 | Toriyama et al. .......... | 252/299 |
| 3,904,797 | 9/1975 | Jones, Jr. et al. ........... | 428/1 |
| 3,922,067 | 11/1975 | Murao et al. ............... | 350/160 LC |
| 3,926,502 | 12/1975 | Tanaka et al. .............. | 350/160 LC |
| 3,956,167 | 5/1976 | Oh ............................... | 252/299 |
| 3,956,168 | 5/1976 | Arai et al. ................... | 252/299 |
| 3,963,638 | 6/1976 | Bucher et al. ............... | 252/299 |
| 3,966,631 | 6/1976 | Toriyama et al. .......... | 252/299 |
| 3,972,589 | 8/1976 | Skelly et al. ................ | 252/299 |
| 3,973,057 | 8/1976 | Channin et al. ............ | 350/160 LC |
| 4,007,077 | 2/1977 | Yaguchi ...................... | 350/160 LC |
| 4,022,934 | 5/1977 | Miller .......................... | 427/126 |
| 4,033,905 | 7/1977 | Bloom et al. ............... | 252/500 |
| 4,064,919 | 12/1977 | Stern et al. .................. | 350/160 LC |

Primary Examiner—Benjamin R. Padgett
Assistant Examiner—T. S. Gron
Attorney, Agent, or Firm—H. Christoffersen; B. E. Morris

[57] ABSTRACT

A dynamic scattering liquid crystal cell is filled from a single fill port by first applying a film of a mixture of at least two resistivity dopants, each having different ions, to the cell walls, then filling the cell with a liquid crystal composition containing both dopants.

6 Claims, 1 Drawing Figure

U. S. Patent　　　May 30, 1978　　　4,091,847
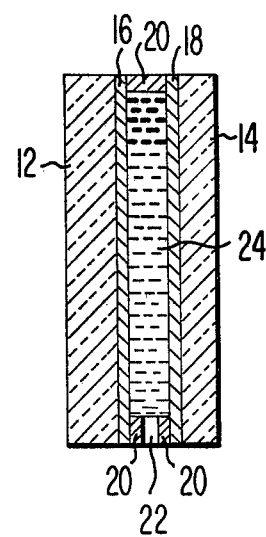

PROCESS FOR FILLING DYNAMIC SCATTERING LIQUID CRYSTAL CELLS

This invention relates to dynamic scattering liquid crystal cells, to compositions therefore and method of filling same. More particularly, this invention relates to dynamic scattering liquid crystal compositions containing more than one ionic dopant to regulate the resistivity of said composition, and method of filling cells with such compositions.

BACKGROUND OF THE INVENTION

Dynamic scattering liquid crystal compositions are well known. These compositions are initially transparent when placed between transparent electrodes due to the alignment of optical domains of the material in the direction of light through the device. When an electric field is applied to the composition, the molecules become turbulent and misalign, thereby scattering light and appearing opaque. In order for this phenomenon to occur, an electric current must pass through the composition. Since pure liquid crystal compounds are nonionic and have a resistivity of $10^{11}$ ohm-cm or higher, an ionic dopant is added to the material to reduce the resistivity to the desired level, generally to the range of about $1 \times 10^8$ to about $5 \times 10^{10}$ ohm-cm. The ionic dopant must be soluble in the liquid crystal and must be capable of reducing the resistivity of the liquid crystal material to the desired level. Homeotropic aligning agents are also generally added to dynamic scattering liquid crystal compositions.

Recently, large liquid crystals cells for displays for calculators, instruments, clocks, gas pumps and the like have been developed. These displays, made from glass plates covered with thin, transparent, conductive films forming the electrodes, must be hermetically sealed to prevent the liquid crystal composition from leaking out or water or oxygen from seeping in. The latter would cause degradation of the liquid crystal compounds. Generally these cells are sealed by a glass frit seal leaving a single port for filling the cell with the liquid crystal material. The port is closed by sputtering certain metal layers around the fill port and soldering over it.

When dynamic scattering liquid crystal compositions are charged to such cells, a phenomenon known as "ion hang-up" occurs which results in a non-homogeneous liquid crystal composition in the cell. It is believed that the inexpensive soda-lime glass employed to make the cells adsorbs the dopant at a faster rate than the glass adsorbs the liquid crystal compositions. Thus the dopant tends to be concentrated near the fill port, causing depletion of dopant at the far end of the cell from the fill port. When such cells are turned on, i.e., when a voltage is applied to the electrodes, the liquid crystal material at the end furthest from the fill port does not dynamic scatter and the cell appears nonuniform.

In copending application of Stern et al Ser. No. 744,128, filed Nov. 22, 1976, U.S. Pat. No. 4,064,919, entitled "Method of Filling Dynamic Scattering Liquid Crystal Devices" filed concurrently herewith, an improved method of filling cells from a single fill port is described. According to this method, the liquid crystal cell is first evacuated, then the fill port is immersed in a solution of the dopant in a volatile solvent, the solvent is evaporated and the cell is reevacuated and the fill port immersed in the desired liquid crystal composition. According to this method, by predoping or saturating the walls of the cell with the dopant, the liquid crystal composition remains uniform in composition and ion hang-up is avoided.

This method, while it allows dynamic scattering liquid crystal cells to be uniformly filled through a single fill port, has certain disadvantages. The vacuum evaporation of the volatile dopant solution, if not done carefully, causes too rapid evaporation of the solvent and consequent supersaturation and precipitation of the dopant on the cell walls in a nonuniform manner. The precipitated dopant is not readily redissolved by the liquid crystal material by filling the cell. Further, if too much dopant is added to the cell walls so that the liquid crystal material becomes supersaturated with dopant, the dopant will precipitate out on standing, particularly if the cell is exposed to low temperatures, forming undesirable, visible crystalline deposits which detract from the appearance of the liquid crystal device.

SUMMARY OF THE INVENTION

According to the present invention, a combination of two or more ionic dopants, which do not have a common ion, are employed in dynamic scattering liquid crystal cells. This prevents precipitation of nonuniform deposits of the dopants on the cell walls, even after storage at very low temperatures.

BRIEF DESCRIPTION OF THE DRAWINGS

The FIGURE is a sectional view of a liquid crystal cell to be filled in accordance with the process of the present invention.

DETAILED DESCRIPTION OF THE INVENTION

A typical liquid crystal cell to be filled according to the present process is shown in the FIGURE and comprises two glass plates 12 and 14 each coated with a thin, transparent, conductive layer 16 and 18, respectively, as of tin oxide, which make up the electrodes. The electrodes can be patterned for digital or other displays. A glass frit seal 20 extends around the periphery of the glass plates except for a single opening or port 22. A layer of liquid crystal material 24, typically about 0.5 micron thick, fills the space defined between the plates.

According to the present process, a solution of two or more ionic dopants to reduce resistivity are dissolved in a volatile solvent, such as a lower alcohol. A liquid crystal cell having a single fill port as in the FIGURE is charged to a vacuum chamber containing a reservoir of the dopant solution, the chamber is evacuated and the cell fill port is immersed in the dopant solution to fill the cell. The solvent is then slowly evaporated from the cell, as by placing in an oven at about 85° – 90° C. The cell is then placed in the vacuum chamber again, this time containing a reservoir of the desired dynamic scattering liquid crystal composition. After evacuation, the cell fill port is immersed in the liquid crystal composition containing the same ionic dopants used to precoat the cell to fill the cell.

The resultant cells are filled with a uniform liquid crystal composition with no visual defects.

Dynamic scattering liquid crystal compositions having negative dielectric anisotropy are well known. Among the nematic compounds useful in forming dynamic scattering liquid crystal mixtures are included p-methoxybenzylidene-p'-butylaniline (MBBA), p-ethoxybenzylidene-p'-butylaniline (EBBA), p-butoxybenzylidene-p'-aminophenyl acetate, p-octylbenzylidene-p'-aminophenyl acetate, butyl-p(p-ethoxyphenoxycarbonyl)phenyl carbonate, p-methoxybenzylidene-p'-aminophenyl benzoate, p-anisylidene-p'-aminophenylbutyrate, p-butoxybenzylidene-p'-aminophenyl pentanoate and the like. Mixtures of the above liquid crystal compounds, particularly eutectic mixtures of for example MBBA and EBBA, are suitably employed for low useful nematic temperatures. A great many useful nematic compounds having negative dielectric anisotropy are well known in the literature.

There are many ionic dopants known to reduce the resistivity of dynamic scattering liquid crystal compositions. These dopants are ionizable organic salts such as bromides, borates, phosphates, quarternary ammonium halide salts, carboxylate or sulfamate salts, phosphonium salts and the like.

Suitable compounds include for example organic halides such as hexadecyltrimethyl ammonium bromide, tetraheptyl ammonium bromide, dibenzyldimethyl ammonium chloride, 1-hexadecyl pyridinium chloride, dodecylisoquinolinium bromide, 10-methylacridinium bromide and the like; organic carboxylate or sulfamate salts such as dioctadecyldimethyl-2-chloro-3,5-dinitrobenzenesulfamate and the like; quaternary ammonium salts of carboxylic acids such as the tetrabutyl ammonium salt of p-aminobenzoic acid, ammonium hydroxide salts of carboxylic acids such as benzyltrimethylammonium hydroxide and the like; ammonium tetraboride compounds such as dioctadecyldimethyl ammonium tetraphenyl boride and the like; p-toluenesulfonic acid; phosphonium salts such as triphenylheptylphosphonium bromide and the like; and pyridinium tetraphenylborate salts such as hexadecylpyridinium tetraphenylborate and the like.

The choice of ionic dopants depends on the solubility of the ionic dopant in the particular liquid crystal employed. The relative amounts of each dopant is not critical, although equimolar amounts ensures that a minimum amount of each dopant will be present. The ions will all be different. One dopant may be an ammonium bromide and the other a pyridinium borate for example.

Homeotropic aligning agents are generally added to dynamic scattering liquid crystal compositions, as is known. The aligning agents aid in uniformly arranging the liquid crystal molecules in a certain direction with respect to the electrode surfaces. Suitable aligning agents include, for example, esters such as alkoxyphenyl alkoxybenzoates and the like; hydroxy-substituted esters such as p-hydroxybenzylidene-p'-aminophenyl acetate and the like; phenols such as p-methoxybenzylidene-p'-aminophenol and the like; long chain carboxylic acid such as p-octyloxybenzoic acid and the like; long chain alcohols such as dodecanol and the like; and long chain silanes such as dodecyltriethoxy silane and the like. Homeotropic aligning agents are generally added in an amount of from about 0.3 to about 2.0% by weight of the liquid crystal mixture.

The invention will be further described in the following example but the invention is not meant to be limited to the details disclosed therein.

EXAMPLE

An ethanol solution containing 0.3 gram per liter of equimolar amounts of hexadecylpyridinium tetraphenyl borate and tetraheptyl ammonium bromide was prepared and charged to a vacuum chamber. A liquid crystal cell as in the FIGURE, having a single fill port, was suspended in the chamber, fill port side down, above the solution. The chamber was evacuated and the fill port immersed in the solution to fill the cell. The cell was then dried in an oven at 85° – 90° C. until the solvent was evaporated, leaving a dopant film on the inside walls of the cell.

A stock liquid crystal mixture was prepared by admixing 165.4 grams of p-methoxybenzylidene-p'-n-butylaniline, 105 grams of p-ethoxybenzylidine-p'-aminophenylbutyrate and 105 grams of p-butoxybenzylidine-p'-aminophenylhexanoate. This mixture had a mesomorphic temperature range of from about −26° to 87° C.

A dopant solution was prepared by adding 50 milligrams of hexadecylpyridinium tetraphenyl borate and 40 milligrams of tetraheptyl ammonium bromide to 20 grams of the above stock liquid crystal mixture. This dopant solution was added dropwise to the remainder of the stock liquid crystal mixture until the resistivity reached $2 \times 10^8$ ohm-cm. One percent by weight of p-methoxybenzylidene-p'-aminophenol was also added as an aligning agent.

The cell as prepared above was again suspended in the vacuum chamber, this time above a reservoir of the doped stock liquid crystal mixture.

The chamber was evacuated and the cell fill port immersed in the liquid crystal solution to fill the cell. No dopants crystallized out of the solution after storage at −10° C. for two days, nor at −20° C. for 2 days.

I claim:

1. In the process whereby a dynamic scattering liquid crystal cell comprising a layer of liquid crystal composition having negative dielectric anisotropy between two electrodes is filled from a single fill port by evacuating said cell, immersing said evacuated cell in a solution of an ionic dopant in a volatile solvent to fill the cell with said solution, evaporating the solvent leaving a film of said dopant on the walls of the cell, evacuating the cell and filling said inner-coated evacuated cell by immersing it in a dynamic scattering liquid crystal composition containing an ionic dopant, the improvement which comprises employing as the ionic dopant in both the volatile solvent and the liquid crystal composition the same-- has been substituted therefor, mixture of at least two ionic dopants having different ions.

2. A process according to claim 1 wherein the doped liquid crystal composition has a resistivity of from about $1 \times 10^8$ to about $5 \times 10^{10}$ ohm-cm.

3. A process according to claim 1 wherein the liquid crystal composition is a mixture containing p-methoxybenzylidine-p'-butylaniline, and p-ethoxybenzylidine-p'-butylaniline.

4. A process according to claim 1 wherein the liquid crystal composition contains p-methoxybenzylidine-p'-n-butylaniline, p-ethoxybenzylidine-p'-aminophenylbutyrate and p-butoxybenzylidine-p'-aminophenylhexanoate.

5. A process according to claim 1 wherein the liquid crystal composition containing an ionic dopant contains in addition a homeotropic aligning agent.

6. A process according to claim 4 wherein the ionic dopants are hexadecylpyridinium tetraphenyl borate and tetraheptyl ammonium bromide.

* * * * *